(No Model.) 2 Sheets—Sheet 1.
P. WISS.
FISHING APPARATUS.
No. 476,940. Patented June 14, 1892.
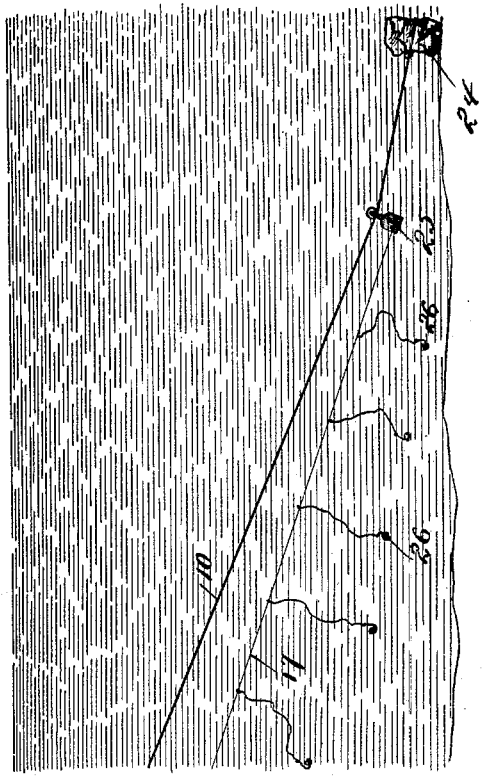
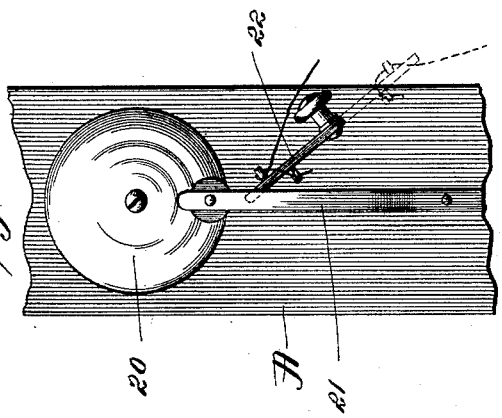
Fig. 5.
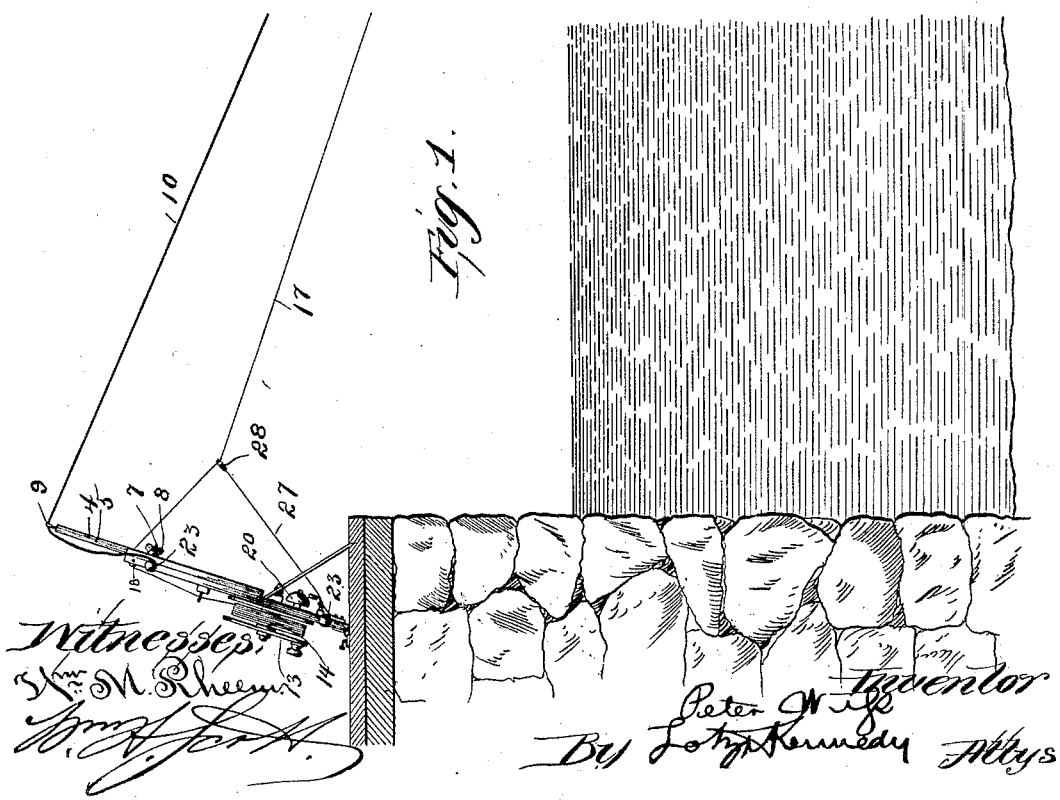
Fig. 1.
Witnesses: Inventor
Peter Wiss
By Loty Kennedy Attys
THE NORRIS PETERS CO., PHOTO-LITHO., WASHINGTON, D. C.

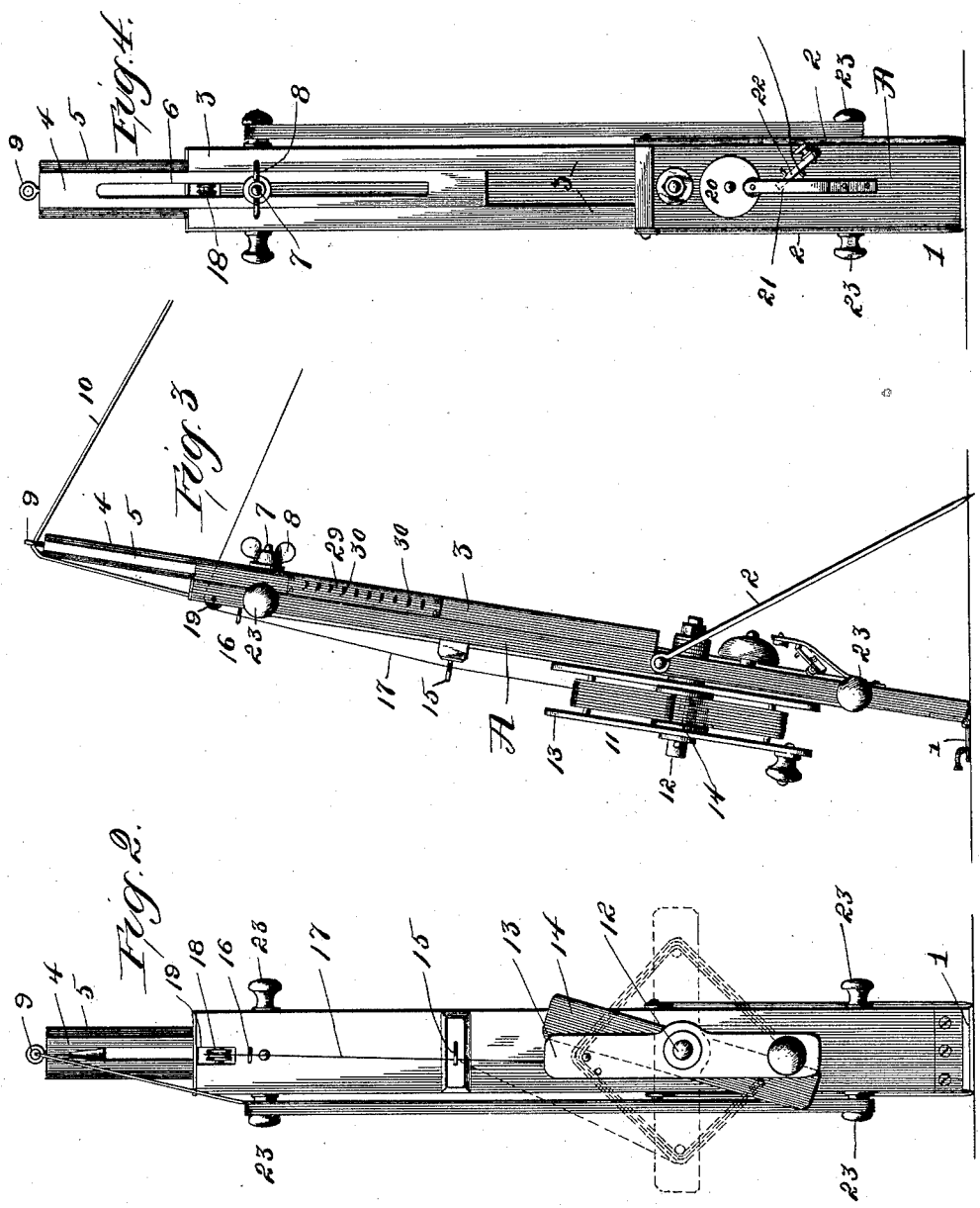

UNITED STATES PATENT OFFICE.

PETER WISS, OF CHICAGO, ILLINOIS.

FISHING APPARATUS.

SPECIFICATION forming part of Letters Patent No. 476,940, dated June 14, 1892.

Application filed October 29, 1891. Serial No. 410,249. (No model.)

*To all whom it may concern:*

Be it known that I, PETER WISS, a citizen of the United States, residing at Chicago, in the county of Cook and State of Illinois, have invented certain new and useful Improvements in Fishing Apparatus; and I do hereby declare the following to be a full, clear, and exact description of the invention, such as will enable others skilled in the art to which it appertains to make and use the same.

This invention relates to a novel construction in fishing-tackle, the object being to provide a device of this character that is durable in construction and efficient in operation.

The invention consists in the features of construction and combinations of parts hereinafter fully described and specifically claimed.

In the accompanying drawings, illustrating my invention, Figure 1 is a side elevation of a fishing-tackle constructed in accordance with my invention. In this figure the device is shown as mounted upon a wharf or pier and in the position it will assume when it is used in fishing. Fig. 2 is a rear elevation. Fig. 3 is a side elevation on an enlarged scale. Fig. 4 is a front elevation. Fig. 5 is a detail view of the alarm mechanism.

Referring to said drawings, A indicates a post or standard having a hinged plate 1 at its lower end, by means of which it can be secured upon a wharf, pier, or similar structure, as shown in Figs. 1 and 3. The said standard is also provided with brace-rods 2, pivoted to the sides thereof, so that when the lower end of said standard is secured to the pier and the same tilted forward said brace-rods will rest upon the pier, and thereby hold said standard in an upright position. The upper portion of said standard is provided with the upright guideways 3, that receive an extension 4, having the lateral guides 5, that slide in said guideways 3. The said extension is provided with a slot 6, and a bolt 7, mounted upon the standard, passes through said slot and is provided with a thumb-nut 8, by means of which height of the extension 4 may be regulated. The upper end of the extension is provided with an eye or guide 9 for the passage of a line 10.

The standard A is provided on its rear side with a reel 11, mounted upon a shaft 12, secured to said standard. The said reel consists of two arms 13 and 14, the arm 13 being provided with a handle for turning the reel. The arms 14 are loosely secured upon the hub of the wheel, whereby they can be turned almost parallel with the arms 13 when the device is packed for transportation, as shown in full lines in Fig. 2, or can be extended at right angles to each other, as shown in dotted lines in Fig. 2 and in full lines in Fig. 3, when the fishing-line is being wound and unwound. Eyes 15 and 16 are secured to the rear side of the standard for guiding a line 17 from said reel, and a guide-pulley or guide 18 is located in an opening 19 in said standard, over which said line 17 passes. A bell 20 is secured to said standard, and a spring-arm 21 carries a hammer adapted to sound said bell. A pivoted lever 22 is normally located between said spring-arm 21 and the bell, so that when said lever 22 is drawn out its end will first draw back the spring-arm and hammer and then release the same, so that it flies back and strikes the bell.

The device is used as follows: The standard is first rigidly secured upon the shore and then the line 10 is unwound from the knobs 23 on said standard. The end of said line 10 is then secured to a rock or weight 24, which is either cast or carried out in a boat a considerable distance and then dropped. The extension is then extended and the line 10 secured to the standard. The said line 10 is inclined at quite an angle, so that a weight 25, having a pulley, will readily run down the line. The fishing-line 17 is secured at one end to said weight 25 and passes over the roller 18 and down to the reel. Near the end of the fishing-line that is attached to the weight 25 one or more hooks 26 are secured, as shown in Fig. 1. After the hooks are baited the reel is unwound and the weight 25, running down the guide-line 10, carries the hooks down near the bottom of the river or lake to be taken by the fish. When a fish takes the bait, by winding up the reel the hooks can be brought out of the water in position for taking the fish therefrom. It will be obvious that any number of hooks can be secured to the line, and consequently more than one fish may be caught each time.

I have also provided a device for giving an alarm when a fish bites, which consists of a cord or connection 27 between the fishing-line and lever 22, so that when the fishing-line and cord 27 are pulled or jerked by a fish said lever will pull the arm 22 and release the same lever and give the alarm in an obvious manner. The cord or connecting-piece 27 between said lever and fishing-line 17 is permanently secured to said lever and is provided at its other end with a hook or clasp 28, by means of which it can be secured to the fishing-line or unhooked therefrom when the line is to be wound up.

The standard is provided laterally with a strip 29, having a series of openings 30, into which the ends of the hooks can be inserted when the device is not in use.

It will be understood that the guide-line can be secured to the weight 24 in such a manner that by giving the guide-line a sudden pull or jerk it will be freed therefrom.

I claim as my invention—

1. In a fishing-tackle, a standard adapted to be secured in an upright position and having a lower guide 18 and an upper guide 9, a guide-line 10, passing through said upper guide 9 and adapted to be secured at its end to a weight on the bottom of a body of water, and a fishing-line passing through said lower guide 18 and connected with a weight having a sliding connection with said guide-line, substantially as described.

2. In a fishing-tackle, a standard adapted to be secured in an upright position and having a lower guide 18 located between its ends, an adjustable extension 4, mounted upon said standard and provided with an upper guide 9 near its upper end, a guide-line 10, passing through said upper guide 9 and adapted to be secured at its end to a weight on the bottom of a body of water, and a fishing-line passing through said lower guide 18 and connected with a weight having a sliding connection with said guide-line, substantially as described.

3. In a fishing-tackle, a standard adapted to be secured in an upright position and having a lower guide 18 and an upper guide 9, a guide-line 10, passing through said upper guide 9 and adapted to be secured at its end to a weight on the bottom of a body of water, and a fishing-line passing through said lower guide 18 and connected with a weight having a sliding connection with said guide-line, an alarm-bell secured to said standard, a spring-arm carrying a hammer adjacent said bell, and a lever located to engage said spring-arm and connected with said lever, substantially as described.

4. In a fishing-tackle, a standard adapted to be secured in an upright position and provided with a sliding extension 4, secured thereto and longitudinally adjustable with relation to said standard, a lower guide 18 upon said standard, an upper guide 9 upon said extension, a guide-line 10, passing through said upper guide 9 and adapted to be secured at its end to a weight on the bottom of a body of water, and a fishing-line passing through said lower guide 18 and connected with a weight having a sliding connection with said guide-line, substantially as described.

In testimony whereof I affix my signature in presence of two witnesses.

PETER WISS.

Witnesses:
WM. H. LOTZ,
HARRY COBB KENNEDY.